US011513273B1

(12) United States Patent
Liu

(10) Patent No.: US 11,513,273 B1
(45) Date of Patent: Nov. 29, 2022

(54) OPTICAL FIBER LANTERN

(71) Applicant: TAIZHOU GONGCHUANG LIGHTING CO., LTD., Taizhou (CN)

(72) Inventor: Pingping Liu, Pingdingshan (CN)

(73) Assignee: TAIZHOU GONGCHUANG LIGHTING CO., LTD., Taizhou (CN)

( * ) Notice: Subject to any disclaimer, the term of this patent is extended or adjusted under 35 U.S.C. 154(b) by 0 days.

(21) Appl. No.: 17/561,667

(22) Filed: Dec. 23, 2021

(30) Foreign Application Priority Data

Sep. 16, 2021 (CN) .......................... 202111084239.8

(51) Int. Cl.
*F21V 8/00* (2006.01)
*F21V 17/10* (2006.01)
*F21V 23/00* (2015.01)

(52) U.S. Cl.
CPC .......... *G02B 6/0008* (2013.01); *F21V 17/101* (2013.01); *F21V 23/003* (2013.01)

(58) Field of Classification Search
CPC .... G02B 6/0008; F21V 17/101; F21V 23/003
USPC ....................................................... 362/551
See application file for complete search history.

(56) References Cited

U.S. PATENT DOCUMENTS

| | | | | |
|---|---|---|---|---|
| 6,039,453 A | * | 3/2000 | Wang ................... | F21S 10/007 362/567 |
| 2004/0070992 A1 | * | 4/2004 | Puleo, Sr. ............... | F21S 4/10 362/556 |
| 2005/0024893 A1 | * | 2/2005 | Wainwright ......... | G02B 6/0008 362/555 |
| 2005/0052883 A1 | * | 3/2005 | Qi ......................... | G09F 9/305 362/555 |
| 2005/0157487 A1 | * | 7/2005 | Epstein ................ | G02B 6/0008 362/101 |
| 2006/0227573 A1 | * | 10/2006 | Chien .................... | F21S 8/035 362/641 |
| 2007/0025120 A1 | * | 2/2007 | Lemay ................. | F21S 10/005 362/555 |
| 2008/0062713 A1 | * | 3/2008 | Dwyer ................. | F21V 33/006 362/555 |
| 2009/0147530 A1 | * | 6/2009 | Wong ...................... | B05B 17/08 362/555 |
| 2017/0108196 A1 | * | 4/2017 | Nakano ................... | G02B 3/00 |
| 2018/0275330 A1 | * | 9/2018 | McRae ................. | F21S 10/005 |

* cited by examiner

*Primary Examiner* — Bryon T Gyllstrom
(74) *Attorney, Agent, or Firm* — Nitin Kaushik

(57) ABSTRACT

Disclosed is an optical fiber lantern, which aims to provide an optical fiber lantern with good integrity, simple structure, strong stability and high aesthetics. The key points of the technical solutions are that the lamp beads are directly powered by a low-voltage power supply or a plug-in power supply, and after the lamp beads emit light, the light is transmitted to a periphery of the petals or the flower core part of the bouquet by optical fiber rods. The low-voltage power supply mode adopted has small use limitation, strong practicability and simple structure, and the present invention is suitable for the technical field of handicraft lanterns.

8 Claims, 4 Drawing Sheets

OPTICAL FIBER LANTERN

FIELD OF THE PRESENT INVENTION

The present invention relates to the technical field of handicraft lanterns, and in particular, to an optical fiber lantern.

DESCRIPTION OF RELATED ART

Optical fiber lantern is a kind of handicraft lantern with good ornamental value. Traditional optical fiber lantern is powered by high voltage, but the limitation of high voltage power supply is great, which is inconvenient to move, and because it is powered by high voltage, there is a risk of leakage and a great potential safety hazard.

Moreover, the traditional optical fiber lantern adopts the bouquet forming method that the optical fiber and petals are randomly combined, and the luminous stick is dotted dispersedly, so the integrity is not good, the petals cannot be well supported, and the aesthetics is poor. Moreover, after the traditional bouquet is assembled with the light source, the illumination uniformity of the light source to the optical fiber group is poor, which affects the luminous effect and has poor practicability.

SUMMARY OF THE PRESENT INVENTION

In view of the shortcomings of the prior art, the objective of the present invention is to provide an optical fiber lantern with good integrity, simple structure, strong stability and high aesthetics.

To achieve the above objective, the present invention provides the following technical solution: An optical fiber lantern, including a base, a bouquet part detachably connected to the base, lamp beads provided on the base and a power supply provided in the base and configured to supply power to the lamp beads, wherein the bouquet part includes petals and an optical fiber group connected to the petals. The optical fiber group consists of a plurality of optical fiber rod groups, the optical fiber group extends from the base to a periphery of the petals or to a flower core of the bouquet; and the optical fiber group is configured to guide light of the lamp beads to the periphery of the petal or a middle of the flower core.

According to the present invention, the petals and the optical fiber group are bonded and pressed by glue, a fixing piece is provided at one end of the optical fiber group connected to the base and the optical fiber group and the fixing piece are bonded by glue.

According to the present invention, one end of each optical fiber rod provided in the fixing piece is provided in an annular array, and one end of each optical fiber rod provided in the fixing piece is flush with an end face of the fixing piece.

According to the present invention, a light correcting piece is further provided between the optical fiber group and the base, the light correcting piece is configured as a lens structure with a convex middle and a thin periphery, the distance between the optical fiber group and the light correcting piece is between 5 mm and 15 mm, and the lamp beads are located on a focal axis of the light correcting piece.

According to the present invention, the fixing piece and the base are detachably connected.

According to the present invention, the power supply outputs a voltage between 3 V to 32 V and a current between 5 mA to 100 mA.

According to the present invention, the power supply is a low-voltage power supply or a plug-in power supply; the low-voltage power supply adopts a solar cell, a storage battery or a water-soluble battery; and the plug-in power supply can be directly connected to a 220V power supply, and the voltage is output after voltage transformation.

According to the present invention, the base is provided with a mounting groove, an outer wall of the fixing piece is provided with an external thread, and the mounting groove is provided with an internal thread matching the external thread; or an interference fit is provided between the fixing piece and the mounting groove.

By adopting the above technical solutions, the present invention has the following beneficial effects: 1. By using, for example, a solar cell, a storage battery or a water-soluble battery as a low-voltage power supply, or directly connecting to a 220V power supply, an appropriate voltage is output through voltage transformation to directly supply power to the lamp beads, and after the lamp beads emit light, the light is transmitted to the periphery of the petals or the flower core part of the bouquet through optical fiber rods; and since the low-voltage power supply mode is adopted, the use limitation is small, the practicability is strong, and the structure is simple.

According to the present invention, the petals and the optical fiber group are bonded and pressed by glue, and a fixing piece is provided at one end of the optical fiber group connected to the base, and the optical fiber group and the fixing piece are bonded by glue, so that the integral strength of the bouquet is improved, and the structural strength between the petals and the optical fiber rods is enhanced through bonding and pressing by glue, so that the optical fiber lantern has strong practicability and simple structure;

A light correcting piece is further provided between the optical fiber group and the base, the light correcting piece is configured as a lens structure with a convex middle and a thin periphery. With the above-mentioned structural arrangement, in order to improve the parallel irradiation of the light on the optical fiber group, the light uniformity of the optical fiber group is improved by the light correcting piece provided between the conduit group and the base, and a good light effect is formed. Moreover, by setting the distance between the optical fiber group and the light correcting piece between 5 mm and 15 mm, and the lamp beads being located on the focal axis of the light correcting piece, it can be ensured that the light is irradiated on the optical fiber group in parallel after passing through the light correcting piece, thus achieving good light effect, strong stability and uniform light.

Figure 1:
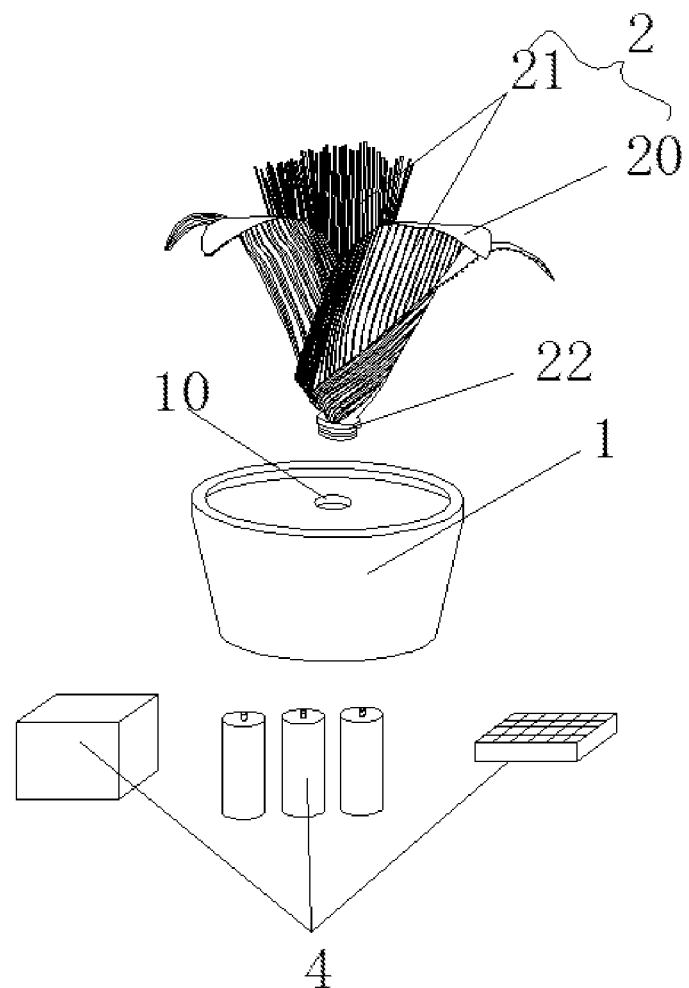
FIG. 1 is a schematic diagram of a split structure of an embodiment of an optical fiber lantern according to the present invention.

Reference numerals: 1. Base; 10. Mounting groove; 2. Bouquet part; 20. Petals; 21. Optical fiber group; 210. Optical fiber rod group; 22. Fixing piece; 23. Light correcting piece; 3. Lamp beads; 4. Power supply.

DETAILED DESCRIPTION OF THE EXEMPLARY EMBODIMENTS

Figure 2:
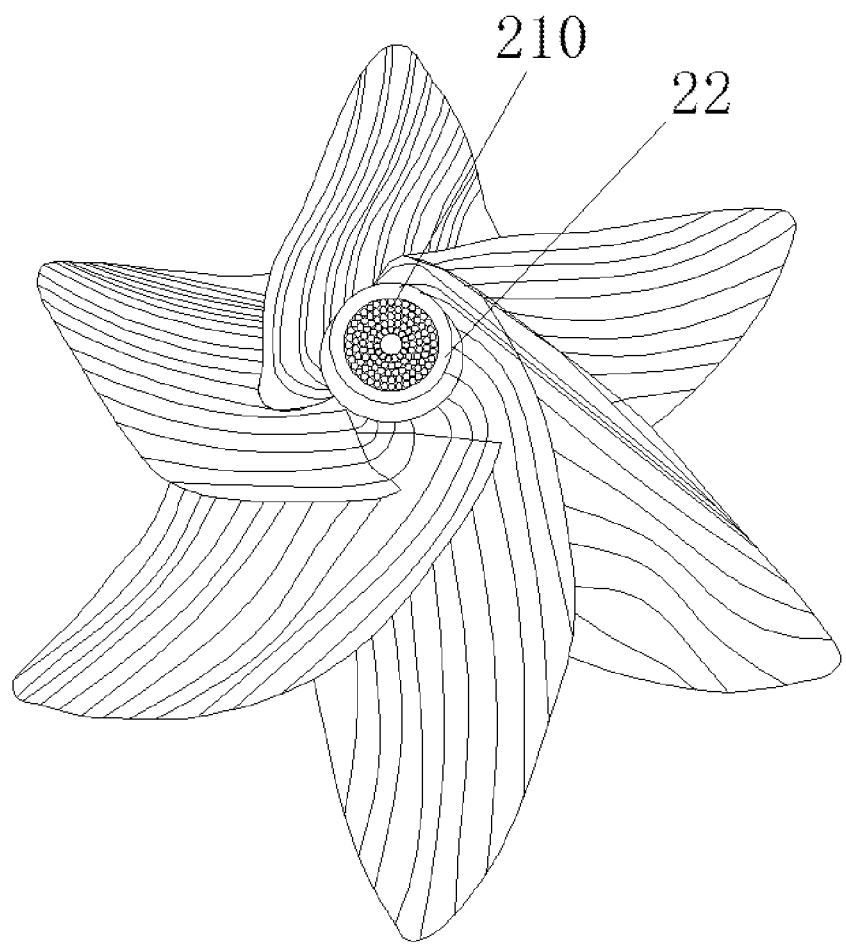
FIG. 2 is a bottom view of a bouquet part of an embodiment of the optical fiber lantern according to the present invention.
Figure 3:
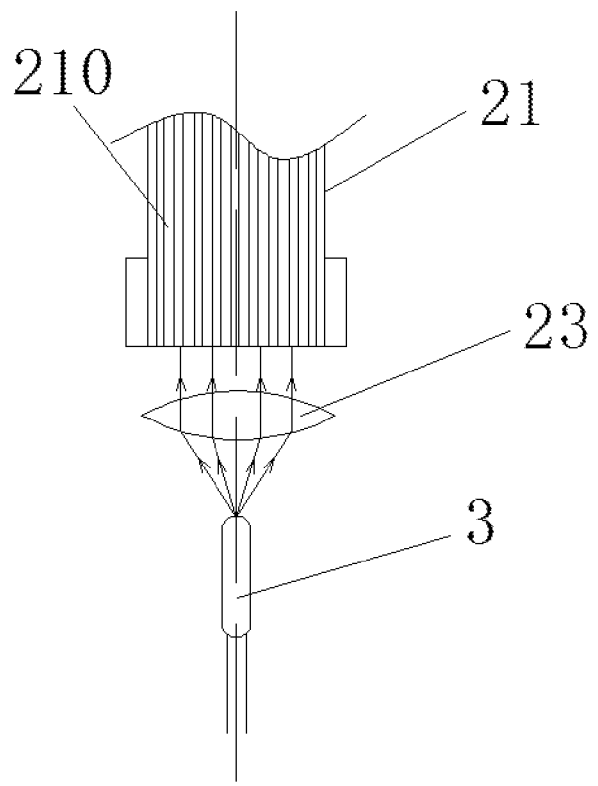
FIG. 3 is a schematic view of the structure of a light correcting piece in Embodiment 1 of the bouquet part of an embodiment of the optical fiber lantern according to the present invention.
Figure 4:
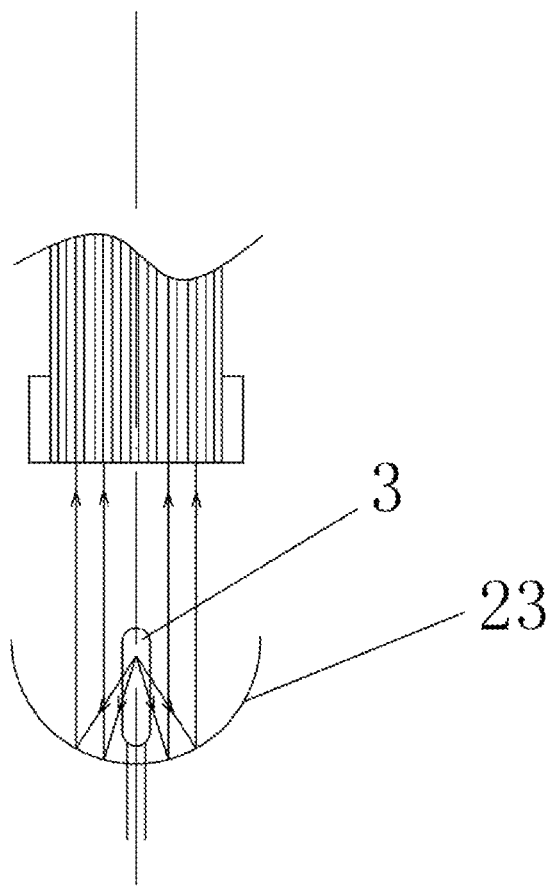
FIG. 4 is a schematic view of the structure of the light correcting piece in Embodiment 2 of the bouquet part of an embodiment of the optical fiber lantern according to the present invention.

Embodiments of an optical fiber lantern of the present invention will be further described with reference to FIGS. 1 to 4.

For ease of explanation, spatial relative terms such as "up", "down", "left" and "right" are used in the embodiments to explain the relationship of one element or feature shown in the figure with respect to another element or feature. It should be understood that in addition to the orientations shown in the figures, spatial terms are intended to include different orientations of the device in use or operation. For example, if a device in the figure is inverted, the element described as being "below" another element or feature will be positioned "above" another element or feature. Therefore, the exemplary term "lower" may include both upper and lower positions. A device can be positioned in other ways (rotated by 90 degrees or in other orientations), and the spatial relative description used here can be interpreted accordingly.

Moreover, relational terms such as "first" and "second" are only used to distinguish one component with the same name from another, and do not necessarily require or imply any such actual relationship or order between these components.

Embodiment 1

An optical fiber lantern includes a base 1, a bouquet part 2 detachably connected to the base 1, lamp beads 3 provided on the base 1 and a power supply 4 provided in the base 1 and configured to supply power to the lamp beads 3. The bouquet part 2 includes petals 20 and an optical fiber group 21 connected to the petals 20, the optical fiber group 21 consists of a plurality of optical fiber rod groups 210, the optical fiber group 21 extends from the base 1 to a periphery of the petals 20 or to a flower core of the bouquet; and the optical fiber group 21 is configured to guide light of the lamp beads 3 to the periphery of the petal 20 or a middle of the flower core. The low-voltage power supply adopts, for example, a solar cell, a storage battery or a water-soluble battery, and the power supply is a low-voltage power supply or a plug-in power supply. By using a solar cell, a storage battery or a water-soluble battery as a low-voltage power supply, or by outputting voltage through a plug-in power supply, the lamp beads 3 is directly powered. After the lamp beads 3 emit light, the light is transmitted to a periphery of the petals 20 or a flower core part of the bouquet by the optical fiber rods. The low-voltage power supply mode has the advantages of small use limitation, strong practicability and simple structure. In this embodiment, the bouquet can be changed according to different kinds of flowers, and then different kinds of bouquets are formed by changing the structure of the optical fiber group 21. Thus, the optical fiber lantern according to the present invention has strong practicability and good ornamental value.

In an embodiment of the present invention, the petals 20 and the optical fiber group 21 can be further configured to be bonded and pressed by glue, and the end of the optical fiber group 21 connected to the base 1 is provided with a fixing piece 22, and the optical fiber group 21 and the fixing piece 22 are bonded by glue, so that the integral strength of the bouquet is improved, and the structural strength between the petals 20 and each optical fiber rod is enhanced by bonding and pressing by glue, so that the structure is strong in practicability and simple in structure.

According to the present invention, one end of each optical fiber rod provided in the fixing piece 22 is provided in an annular array, and one end of the optical fiber rod provided in the fixing piece 22 is flush with the end face of the fixing piece 22. By adopting the above-mentioned structural arrangement, the end of the optical fiber rod can fully contact with the light source, thus improving the light effect; and after being fixed in a flat manner, the stability is strong, and at the same time, the distribution uniformity of the light source can be ensured.

According to the present invention, a light correcting piece 23 is further provided between the optical fiber group 21 and the base 1, the light correcting piece 23 is configured as a lens structure with a convex middle and a thin periphery. With the above-mentioned structural arrangement, in order to improve the parallel irradiation of the light on the optical fiber group 21, the light uniformity of the optical fiber group is improved by the light correcting piece 23 provided between the conduit group and the base 1, and a good light effect is formed. Moreover, by setting the distance between the optical fiber group 21 and the light correcting piece 23 between 5 mm and 15 mm, and the lamp beads 3 being located on the focal axis of the light correcting piece 23, it can be ensured that the light is irradiated on the optical fiber group 21 in parallel after passing through the light correcting piece 23, thus achieving good light guiding effect, strong stability and high light guiding uniformity.

According to the present invention, the fixing piece 22 is detachably connected to the base 1, and the mounting groove 10 is provided on the base 1, the outer wall of the fixing piece 22 is provided with an external thread, and the mounting groove 10 is internally provided with an internal thread matched with the external thread; or an interference fit is provided between the fixing piece 22 and the mounting groove 10. By means of screw connection or direct insertion with interference fit, on the one hand, it is convenient for maintenance, on the other hand, it improves the convenience of mounting, thus the optical fiber lantern is easy to adapt to different product types and use environments, and has strong practicability and simple structure.

According to the present invention, the voltage of the low-voltage power supply 4 is between 3 V to 32 V, the current is between 5 mA-100 mA, and the plug-in power supply is 220V, which needs to be transformed to an appropriate voltage through a transformer. With the above-mentioned structural arrangement, the low-voltage power supply 4 and the magnitude of the current are in a range that can achieve light emission of the lamp beads 3, thus the optical fiber lantern has good practical effect, the use limitation of the optical fiber lantern is reduced, and the good use effect is improved.

Embodiment 2

The structure of this embodiment is basically the same as that of Embodiment 1. The only difference is that in this embodiment, the base 1 is also provided with a light correcting piece 23. The light correcting piece 23 is configured as a bowl-shaped reflective structure, and the light correcting piece 23 covers the lamp beads 3. With this structure, on the one hand, the waste of brightness is reduced, on the other hand, the mounting space is relatively reduced, and the space utilization is increased. At the same time, a good condensing effect is formed, so that the light emitted by the lamp beads 3 is reflected by the concave surface of the bowl-mounted reflective structure and then enters the end face of the optical fiber rod in parallel, thus ensuring that the light is evenly irradiated on the optical fiber group 21, further achieving good light guiding effect, strong stability and high light guiding uniformity.

The foregoing descriptions are only preferred embodiments of the present invention and are not intended to limit the present invention. Ordinary changes and substitutions within the technical solutions of the present invention made by those skilled in the art shall fall within the protection scope of the present invention.

What is claimed is:

1. An optical fiber lantern, comprising a base (1), a bouquet part (2) detachably connected to the base (1), lamp beads (3) provided on the base (1) and a power supply (4) provided in the base (1) and configured to supply power to the lamp beads (3), wherein the bouquet part (2) comprises petals (20) and an optical fiber group (21) connected to the petals (20), the optical fiber group (21) consists of a plurality of optical fiber rod groups (210), the optical fiber group (21) extends from the base (1) to a periphery of the petals (20) or to a flower core of the bouquet; and the optical fiber group (21) is configured to guide light of the lamp beads (3) to the periphery of the petal (20) or a middle of the flower core; the petals (20) and the optical fiber group (21) are bonded and pressed by glue, a fixing piece (22) is provided at one end of the optical fiber group (21) connected to the base (1), and the optical fiber group (21) and the fixing piece (22) are bonded by glue.

2. The optical fiber lantern according to claim 1, wherein one end of each optical fiber rod provided in the fixing piece (22) is provided in an annular array, and one end of each optical fiber rod provided in the fixing piece (22) is flush with an end face of the fixing piece (22).

3. The optical fiber lantern according to claim 1, wherein a light correcting piece (23) is further provided between the optical fiber group (21) and the base (1), the light correcting piece (23) is configured as a lens structure with a convex middle and a thin periphery, the light emitted by the lamp beads (3) passes through the lens structure and enters an end face of the optical fiber rod in parallel, the distance between the optical fiber group (21) and the light correcting piece (23) is between 5 mm and 15 mm, and the lamp beads (3) are located on a focal axis of the light correcting piece (23).

4. The optical fiber lantern according to claim 1, wherein the base (1) is further provided with a light correcting piece (23), the light correcting piece (23) covers the lamp beads (3), the light correcting piece (23) is configured as a bowl-mounted reflective structure, and light emitted by the lamp beads (3) enters an end face of the optical fiber rod in parallel after being reflected by a concave surface of the bowl-mounted reflective structure.

5. The optical fiber lantern according to claim 1, wherein the power supply (4) outputs a voltage between 3 V to 32 V and a current between 5 mA to 100 mA.

6. The optical fiber lantern according to claim 1, wherein the fixing piece (22) and the base (1) are detachably connected.

7. The optical fiber lantern according to claim 4, wherein the base (1) is provided with a mounting groove (10), an outer wall of the fixing piece (22) is provided with an external thread, and the mounting groove (10) is provided with an internal thread matching the external thread; or an interference fit is provided between the fixing piece (22) and the mounting groove (10).

8. The optical fiber lantern according to claim 1, wherein the power supply is a low-voltage power supply or a plug-in power supply.

* * * * *